United States Patent
Butterfield, IV

(10) Patent No.: US 11,434,080 B2
(45) Date of Patent: Sep. 6, 2022

(54) TANK COVER LIFTING TOOL

(71) Applicant: Chevron U.S.A. Inc., San Ramon, CA (US)

(72) Inventor: Albert E. Butterfield, IV, Novato, CA (US)

(73) Assignee: CHEVRON U.S.A. INC., San Ramon, CA (US)

( * ) Notice: Subject to any disclaimer, the term of this patent is extended or adjusted under 35 U.S.C. 154(b) by 53 days.

(21) Appl. No.: 17/120,510

(22) Filed: Dec. 14, 2020

(65) Prior Publication Data

US 2022/0185632 A1 Jun. 16, 2022

(51) Int. Cl.
*B65G 7/12* (2006.01)
*B66C 1/34* (2006.01)
*B66C 1/62* (2006.01)

(52) U.S. Cl.
CPC ............... *B65G 7/12* (2013.01); *B66C 1/34* (2013.01); *B66C 1/62* (2013.01)

(58) Field of Classification Search
CPC .... B65G 7/12; B66C 1/22; B66C 1/34; B66C 1/62; B66C 1/66
USPC .......... 294/15, 67.22, 67.3; 414/10; 29/464, 29/466
See application file for complete search history.

(56) References Cited

U.S. PATENT DOCUMENTS

| | | | | |
|---|---|---|---|---|
| 765,674 A * | 7/1904 | Normandin | | |
| 824,822 A * | 7/1906 | Samuelson | | |
| 848,124 A * | 3/1907 | Peeler | | |
| 1,177,560 A * | 3/1916 | Wilson | ..................... | B65G 7/12 D23/303 |
| 1,843,245 A * | 2/1932 | Sederland | ................. | A45F 5/10 294/15 |
| 2,599,938 A * | 6/1952 | Price | ..................... | B66F 19/005 294/15 |
| 2,828,155 A * | 3/1958 | Schwankl | ................ | B65G 7/12 294/16 |
| 3,685,126 A * | 8/1972 | Kane | ........................ | B25D 1/16 29/271 |
| 6,270,133 B1 * | 8/2001 | Babcock | .................. | B65G 7/12 294/26 |
| 8,382,176 B2 * | 2/2013 | Meza | .................... | B66F 19/005 294/97 |
| 8,960,748 B2 * | 2/2015 | Scott | ....................... | B25B 27/16 294/82.13 |
| 10,227,216 B2 * | 3/2019 | Ranger | ..................... | B66C 1/28 |

* cited by examiner

*Primary Examiner* — Dean J Kramer
(74) *Attorney, Agent, or Firm* — King & Spalding LLP

(57) ABSTRACT

A tank cover lifting tool is configured to remove or attach tank covers. The tank cover lifting tool includes a handle center support, a first handle connected to one end of the handle center support, and a second handle connected to another end of the handle center support. In addition, the tank cover lifting tool includes a first lifting block that is locked on the handle center support and that is configured to engage a first tank cover handle of a tank cover. Further, the tank cover lifting tool includes a second lifting block that is locked on the handle center support and that is configured to engage a second tank cover handle of the tank cover.

19 Claims, 7 Drawing Sheets

TANK COVER LIFTING TOOL

TECHNICAL FIELD

The present disclosure relates generally to a tank cover lifting tool that is used to remove or attach tank covers.

BACKGROUND

In applications such as oil refineries, power plants, and gas operations, tank covers are operated often to be removed from or attached to a tank. Those tank covers are usually made from metal materials and have a weight ranging from 50 pounds to 300 pounds. Further, the tank covers may have various shapes including round, oval, and square, and have large sizes ranging from 2 square feet to 15 square feet. The removing and attaching of the tank covers is challenging due to their heavy weight and large size.

Additionally, the tank covers usually include tank cover handles extending out of the tank cover surface. A field worker can grip the tank cover handles for general operations. However, a center of gravity of the tank cover is offset from the tank cover handles and therefore a downward moment caused by the gravity of the tank cover flips over the tank cover from an original upright position. Thus, it is difficult for the field worker to manually operate the tank cover by dragging the tank cover handles while keeping the tank cover in the upright position. The flipping of the tank cover may cause safety issues to the field worker. Moreover, the field worker struggles with holding the tank cover in position while installing or uninstalling bolts on the tank cover.

Further, a gasket is usually associated with the tank cover and is installed between the tank flange and the tank cover to avoid leaking. The gasket is a ring of rubber or other material sealing the junction between surfaces of the tank flange and the tank cover. In general, the gasket is manually held by the field worker while installing the tank cover on the tank. Through holes of the gasket have to be aligned with through holes of the tank flange and the tank cover so that bolts can later be inserted into the through holes to secure the tank cover onto the tank. It is challenging for the field worker to manually hold the gasket in place while attaching the tank cover to the tank, particularly due to the heavy weight of the tank cover. If the field worker does not remove his/her hand from holding the gasket in place, the field worker's hand may be caught between the heavy tank cover and the gasket causing injury.

Therefore, a tank cover lifting tool that helps with securing the gasket and removing or attaching tank covers from a tank cover flange while maintaining the tank cover in the original upright position may be desirable.

SUMMARY

The present disclosure relates generally to removing or attaching tank covers using a tank cover lifting tool. In an example embodiment, a tank cover lifting tool includes a handle center support, a first handle connected to one end of the handle center support, and a second handle connected to another end of the handle center support. In addition, the tank cover lifting tool includes a first lifting block that is locked on the handle center support and that is configured to engage a first tank cover handle of a tank cover. Further, the tank cover lifting tool includes a second lifting block that is locked on the handle center support and that is configured to engage a second tank cover handle of the tank cover.

In another example embodiment, a method for removing a tank cover from a tank includes removing at least one bolt from a through hole of the tank cover and a tank cover flange. The method also includes installing a guide pin through the through hole of the tank cover and the tank cover flange. In addition, the method includes removing remaining bolts from the tank cover and the tank cover flange and installing a tank cover lifting tool on the tank cover. Moreover, the method includes removing the tank cover from the tank by using the tank cover lifting tool to slide the tank cover off the guide pin.

In another example embodiment, a method for attaching a tank cover to a tank includes installing a tank cover lifting tool on the tank cover and installing at least one guide pin through a flange alignment through hole of a tank cover flange. The method also includes installing the tank cover on the tank cover flange by aligning the guide pin extending from the tank cover flange with a tank cover alignment through hole of the tank cover and sliding the tank cover onto the guide pin. In addition, the method includes installing bolts through remaining through holes of the tank cover and the tank cover flange. Furthermore, the method includes removing the guide pin from the tank cover flange and the tank cover and removing the tank cover lifting tool from the tank cover and installing a bolt through the alignment through holes of the tank cover and the tank cover flange.

These and other aspects, objects, features, and embodiments will be apparent from the following description and the appended claims.

BRIEF DESCRIPTION OF THE DRAWINGS

Reference will now be made to the accompanying drawings, which are not necessarily drawn to scale, and wherein.

Figure 1:
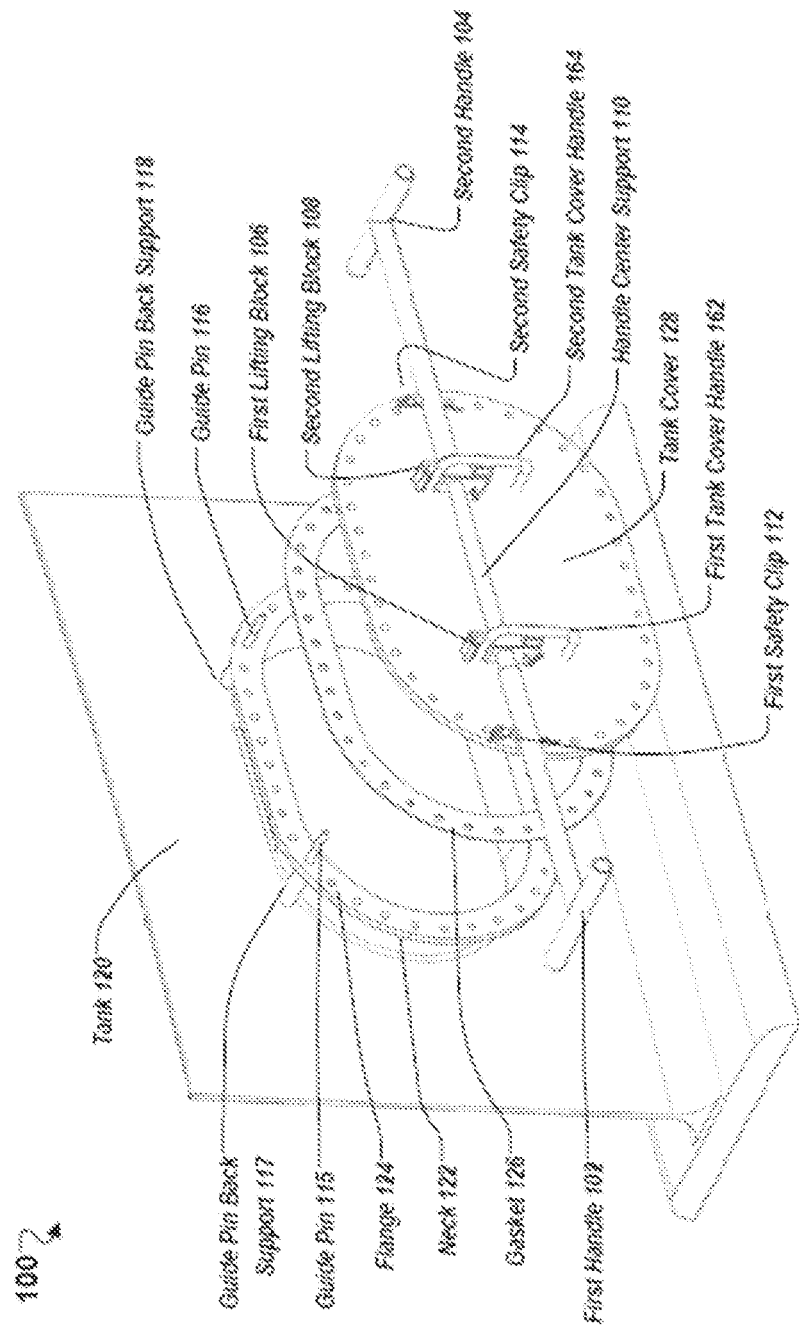
FIG. 1 is a perspective view of a tank cover lifting tool for removing or attaching a tank cover according to an example embodiment.

The drawings illustrate only example embodiments and are therefore not to be considered limiting in scope. The elements and features shown in the drawings are not necessarily to scale, emphasis instead being placed upon clearly illustrating the principles of the example embodiments. Additionally, certain dimensions or placements may be exaggerated to help visually convey such principles. In the drawings, the same reference numerals used in different embodiments designate like or corresponding, but not necessarily identical, elements.

DETAILED DESCRIPTION OF EXAMPLE EMBODIMENTS

In the following paragraphs, particular embodiments will be described in further detail by way of example with reference to the drawings. In the description, well-known components, methods, and/or processing techniques are omitted or briefly described. Furthermore, reference to various feature(s) of the embodiments is not to suggest that all embodiments must include the referenced feature(s).

Turning now to the drawings, FIG. 1 is a perspective view of a tank cover lifting tool 100 for removing or attaching a tank cover 128 according to an example embodiment. The tank cover lifting tool 100 is configured to be attached on the tank cover 128 in order to remove the tank cover 128 from the tank 120 or to attach the tank cover 128 to the tank 120. The tank cover lifting tool 100 can remove or attach the tank cover by lifting the tank cover and sliding the tank cover off or onto one or more guide pins, respectively.

In an example embodiment, the tank 120 includes a tank cover neck 122, a tank cover flange 124, a gasket 126, and the tank cover 128. The tank cover 128 is attached to the tank cover flange 124 by aligning and bolting through holes of the tank flange 124, tank gasket 126 and the tank cover 128. The tank cover 128 also includes a first tank cover handle 162 and a second tank cover handle 164 that are aligned in parallel and that are located outside the tank cover 128. In an example embodiment, the tank cover 128 is oval and is perpendicular to the ground. Additionally, the tank cover 128 has a longitudinal axis in parallel to the ground. In another example embodiment, the tank cover 128 is circular or rectangular, and is in a plane perpendicular to the ground.

In an example embodiment, the tank cover lifting tool 100 includes a first handle 102, a second handle 104, a handle center support 110, a first lifting block 106, and a second lifting block 108. The handle center support 110 is a bar located at a center of the tank cover lifting tool 100 and has a first and a second ends with a first and a second through holes respectively located thereon. The first handle 102 is in a T shape with a first straight handle bar and a first leg bar that has a plurality of through holes processed thereon. This first leg bar is perpendicular to the first straight handle bar and has one end connected to a center of the first straight handle bar. In this example, the first handle 102 is connected with the handle center support 110 by inserting the first end of the handle center support 110 into the first leg bar of the first handle 102. In addition, one of the through holes of the first handle 102 is aligned with the first through hole of the handle center support 110. The connection of the first handle 102 and the handle center support 110 is further secured by installing a first safety clip 112 through the aligned through holes of the first handle 102 and the handle center support 110.

Similarly, the second handle 104 is in a T shape with a second straight handle bar and a second leg bar that has a plurality of through holes processed thereon. This second leg bar is perpendicular to the second straight handle bar and has one end connected to a center of the second straight handle bar. Here, the second handle 104 is connected with the handle center support by inserting the second end of the handle center support 110 into the second leg bar of the second handle 104. Further, one of the through holes of the second handle 104 is aligned with the second through hole of the handle center support 110. The connection of the second handle 104 and the handle center support 110 is secured by installing a second safety clip 114 through the aligned through holes of the second handle 104 and the handle center support 110. In this example, the first and second through holes of the handle center support 110 are equidistantly located from a center of the handle center support 110. In an example embodiment, the first handle 102 and the second handle 104 are both in a Y shape and each includes a V-shaped handle bar and a leg bar. The leg bar has one end connected to a vertex of the V-shaped handle bar.

In an example embodiment, the first lifting block 106 and the second lifting block 108 are located on the handle center support 110. As shown in FIG. 1, each of the first lifting block 106 and the second lifting block 108 has a hole through which the handle center support 110 pass. Specifically, the first lifting block 106 and the second lifting block 108 are locked on the handle center support 110 and can not rotate in a transverse plane about the longitudinal axis of the handle center support 110. For example, the first and second lifting blocks may have spring loaded pins respectively placed inside each hole of the first and second lifting blocks, the pins being locked into through holes of the handle center support 110 to secure the first and second lifting blocks thereon. Further, the first lifting block 106 and the second lifting block 108 are configured to engage the first tank cover handle 162 and the second tank cover handle 164, respectively. In this example, the first lifting block 106 engages the first tank cover handle 162 by inserting a top portion of the first tank cover handle 162 into a first cavity 105 of the first lifting block 106. Similarly, the second lifting block 108 engages the second tank cover handle 164 by inserting a top portion of the second tank cover handle 164 into a second cavity 109 of the second lifting block 106.

In an example embodiment, the first cavity 105 of the first lifting block 106 includes a first opening and a first pocket 107 into which the top portion of the first tank cover handle 162 fits. The first lifting block 106 can engage the first tank cover handle 162 by passing the top portion of the first tank cover handle 162 through the first opening of the first lifting block 106 and then raising the first lifting block 106 to have the top portion of the first tank cover handle 162 settled in the first pocket 107 of the first lifting block 106. Here, the first pocket 107 is offset from the first opening of the first lifting block 106 in order to secure the top portion of the first tank cover handle 162 therein.

Similarly, the second cavity 109 of the second lifting block 108 includes a second opening and a second pocket 111 into which the top portion of the second tank cover handle 164 fits. The second lifting block 108 can engage the second tank cover handle 164 by passing the top portion of the second tank cover handle 164 through the second opening of the second lifting block 108 and then raising the second lifting block 108 to have the top portion of the second tank cover handle 164 settled in the second pocket 111 of the second lifting block 108. Again, the second pocket 111 is offset from the second opening of the second lifting block 108 so as to secure the top portion of the second tank cover handle 164 therein.

In an example embodiment, when the first and second lifting blocks respectively engage the first and second tank cover handles, the handle center support 110 passes through the first and the second tank cover handles 162 and 164, and is aligned in parallel to the tank cover 128. Specifically, a longitudinal axis of the handle center support 110 is perpendicular to the top portion of the first tank cover handle 162 and the top portion of the second tank cover handle 164. In this condition, the first handle 102 including the first handle bar and the first leg bar is in a plane perpendicular to a plane of the tank cover 128. Similarly, the second handle 104 including the second handle bar and the second leg bar is in a plane perpendicular to a plane of the tank cover 128. Here, the first and the second handle bars are aligned horizontally so that workers can hold the first and the second handle bars and lift the tank cover 128 through the handle center support 110 and the first and the second lifting blocks 106 and 108. In an example embodiment, the tank cover lifting tool 100 is longer than the tank cover 128. Specifically, the first handle bar and the second handle bar of the tank cover lifting tool 100 are located at a distance from the tank cover 128 so as to provide a space for the workers to perform tank cover lifting operations.

In an example embodiment, the tank cover lifting tool 100 further includes a plurality of guide pins and a plurality of guide pin back supports. For example, FIG. 1 shows two guide pins 115 and 116 that extend out of the tank cover flange 124. The guide pines 115 and 116 each has a tapered end facing out of the tank 120 and a threaded end facing into the tank 120. In this example, the guide pin 115 is inserted through a through hole of the tank cover flange 124 so that the tapered end of the guide pin 115 extends out of the through hole and away from the tank. The threaded end of the guide pin 115 is threaded into the guide pin back support 117 which is located in a region of the tank cover neck 122 and is in contact with the tank 120. The guide pin 116 has a similar configuration to the guide pin 115 and is located at another through hole of the tank cover flange 124 by inserting the guide pin 115 into the other through hole. Likewise, the threaded end of the guide pin 116 is threaded into the guide pin back support 118 which is located in a region of the tank cover neck 122 and is in contact with the tank 120. In this example, the guide pins 115 and 116 are respectively tightened on the tank cover flange 124 by screw nuts respectively threaded on the guide pins 115 and 116 at a backside of the tank cover flange 124. Alternatively, only one of either the screw nuts or the back supports may be threaded onto the guide pins to secure the guide pins to the tank cover flange 124. In this example, the tank cover 128 is oval and the guide pins 115 and 116 are located at a 11 o'clock and a 1 o'clock positions of the tank cover flange 124, respectively. In other example embodiments, the tank cover 128 can be circular and the tank cover lifting tool can only include one guide pin and one guide pin back support which are located at a 12 o'clock position of the tank cover flange 124.

In an example embodiment and during operations of removing the tank cover 128 from the tank 120, at least one bolt is removed from a through hole of the tank cover 128 and the tank cover range 124. In this example, two bolts are removed from two through holes through which the guide pins 115 and 116 are later respectively installed. Further, additional bolts are removed from through holes of the tank cover 128 and the tank cover range 124. As shown in FIG. 1, guide pin back supports 117 and 118 and corresponding screw nuts are respectively threaded on the guide pins 115 and 116 to secure corresponding guide pins. After that, the tank cover lifting tool 100 is installed on the tank cover 128 by engaging the first lifting block 106 and the second lifting block 108 to the first tank cover handle 162 and the second tank cover handle 164, respectively. In this example, two workers may stand next to the tank cover 128, respectively holding the first handle 102 and the second handle 104 to lift the tank cover 128 through the engagements between the first and second lifting blocks and the first and second tank cover handles. The tank cover 128 is further removed by those two workers by sliding the tank cover 128 off the guide pins 115 and 116. In an example embodiment, the tank cover 128 has a weight up to 100 pounds. In an example embodiment, the tank cover lifting tool engages top portions of the first and second tank cover handles and therefore the tank cover lifting tool is laterally close to a center of gravity of the tank cover 128. The two workers are able to keep the tank cover 128 in an original upright position and so that the tank cover does not spin during the operations by applying a proper force through the first and second handles of the tank cover lifting tool 100. The forces that the workers apply on the first and second handles of the tank cover lifting tool 100 to maintain the tank cover 128 balanced in an original upright position (as illustrated in FIG. 1) are much smaller than the forces that would be required if the workers gripped the tank cover handles 162 and 164 along the long gripping portions of the tank cover handles.

In another example embodiment, the installation of the tank cover lifting tool is performed at the beginning of above described operations. In another example embodiment, four workers can work together to lift a heavier tank cover, e.g., a tank cover in a range from 100 pounds to 200 pounds. In this example, each two workers can stand next to the first or second handle of the tank cover lifting tool 100 and respectively hold two ends of the first or second handle bar. In an example embodiment, the components of the tank cover lifting tool 100 are made of materials including aluminum, cobalt, copper, nickel, titanium, and steel.

In an example embodiment and during operations of attaching the tank cover 128 onto the tank cover flange 124, the tank cover lifting tool 100 is firstly installed on the tank cover 128. Specifically, the first lifting block 106 and the second lifting block 108 of the tank cover lifting tool 100 are engaged to the first tank cover handle 162 and the second tank cover handle 164, respectively. In addition, at least one guide pin is installed through a flange alignment through hole of the tank cover flange 124. In this example, two guide pins 115 and 116, as well as corresponding guide pin back supports 117 and 118 are installed on the tank cover flange 124. Following that, the gasket 126 is installed on the tank cover flange 124 by inserting the guide pins 115 and 116 through corresponding through holes of the gasket 126. With the guide pins, the gasket 126 hangs securely next to the tank cover flange 124 having all through holes aligned with those of the tank cover flange 124 without the need for the worker to hold the gasket in place. Next, the tank cover 128 is lifted by two workers respectively holding the first handle 102 and the second handle 104 of the tank cover lifting tool 100. The tank cover 128 is aligned to the tank cover flange by aligning tank cover alignment through holes with the extending guide pins 115 and 116. Further, the tank cover 128 is attached onto the tank cover flange 124 by sliding the tank cover laterally towards the tank 120 using the tank cover lifting tool 100. Lastly, bolts are threaded through the through holes of the tank cover 128, gasket 126 and the tank cover flange 124 in order to secure the tank cover 128 onto the tank 120 and seal the junction between the tank cover 128 and the tank cover flange 124 with the gasket 126 therebetween. In this example, the field worker does not need to manually hold the gasket 126 during the tank cover installation. Instead, the alignment and securing of the gasket 126 can be achieved by inserting one or more guide pins through the through holes of the gasket 126. This configuration of the tank cover lifting tool 100 eliminates the probability of the worker's hand being caught between the tank cover and gasket during the tank cover installation and improves the safety performance.

Figure 2:
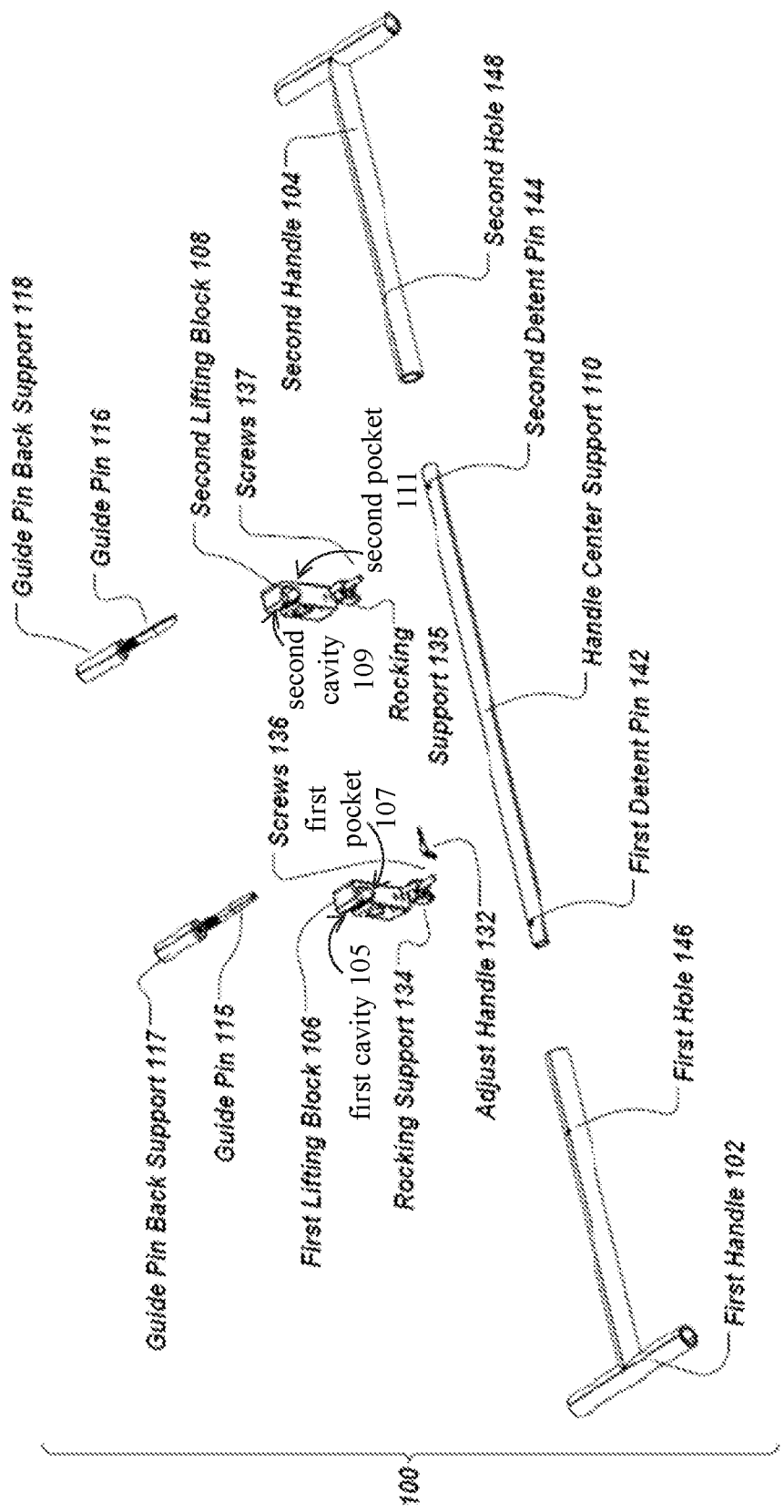
FIG. 2 is an exploded view of the tank cover lifting tool of FIG. 1 according to an example embodiment.

FIG. 2 is an exploded view of the tank cover lifting tool 100 of FIG. 1 according to an example embodiment. To minimize redundancy, not all features of the tank cover lifting tool 100 discussed with respect to FIG. 1 are repeated below. As described above, the tank cover lifting tool 100 includes the first handle 102, the second handle 104, the handle center support 110, the first lifting block 106, and the second lifting block 108. FIG. 2 illustrates detailed configurations and components included in the first lifting block 106 and the second lifting block 108.

In an example embodiment, the first lifting block 106 includes a rocking support 134, an adjust handle 132, and a plurality of screws 136. The screws 136 are double end threaded screws having two ends that are respectively threaded into the rocking support 134 and the first lifting block 106. A position of the rocking support 134 relative to the first lifting block 106 is adjusted by inserting the adjust handle 132 into the first lifting block 106 and engaging at least one of the screws 136. Further, when installing the tank cover lifting tool 100 on the tank cover 128, the position of the rocking support 134 is adjusted to have it engage a gripping portion of the first tank cover handle 162. This way, the first lifting block 106 is secured within the first tank cover handle 162 and not able to drift laterally along the top portion of the first tank cover handle 162 once the tank cover lifting tool 100 is installed. The second lifting block 108 has similar components and configurations to the first lifting block 106. For example, a rocking support 135 connects to the second lifting block 108 through a plurality of screws 137 and engages a gripping portion of the second tank cover handle 164. Similarly, the second lifting block 108 is secured within the second tank cover handle 164 and not able to drift laterally along the top portion of the second tank cover handle 164.

In an example embodiment, the handle center support 110 has a first detent pin 142 located at one end of the handle center support 110 and a second detent pin 144 located at another end of the handle center support 110. The first handle 102 is connected with the handle center support 110 by inserting the one end of the handle center support 110 into the leg bar of the first handle 102. The first handle 102 is further locked on the handle center support 110 by aligning and locking the first detent pin 142 into a first hole 146 of the first handle 102. Similarly, the second handle 104 is connected with the handle center support 110 by inserting another end of the handle center support 110 into the leg bar of the second handle 104. The second handle 104 is further locked on the handle center support 110 by aligning and locking the second detent pin 144 into a second hole 148 of the second handle 104. In this example, the first detent pin 142 and the second detent pin 144 are located equidistantly from the center of the handle center support 110.

Figure 3:
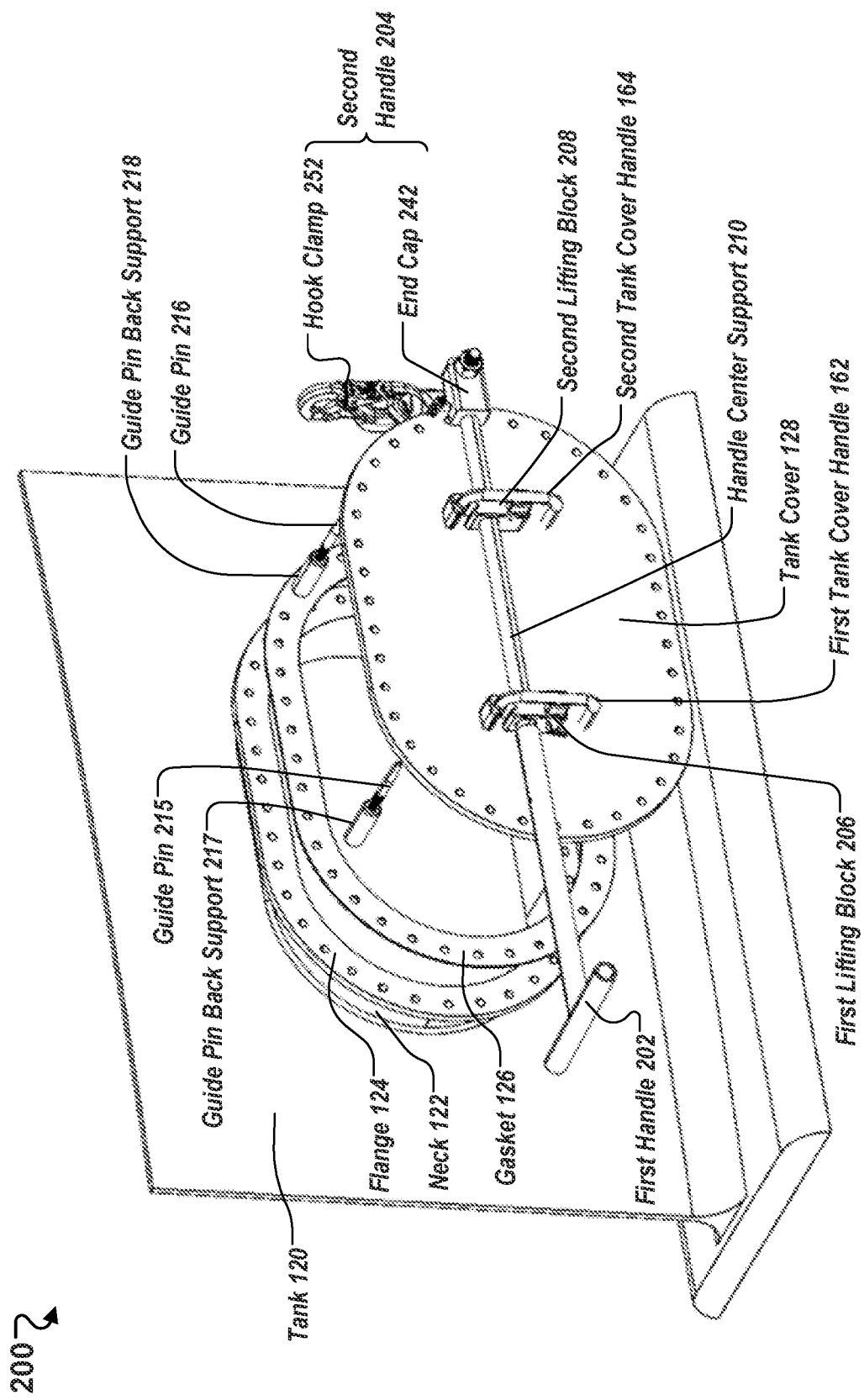
FIG. 3 is a perspective view of a tank cover lifting tool for removing or attaching a tank cover according to another example embodiment.

FIG. 3 is a perspective view of a tank cover lifting tool 200 for removing or attaching a tank cover according to another example embodiment. Similar to the tank cover lifting tool 100 described in FIG. 1, the tank cover lifting tool 200 includes a first handle 202, a second handle 204, a handle center support 210, a first lifting block 206, and a second lifting block 208. In this example, the first handle 202, the handle center support 210, the first lifting block 206, and the second lifting block 208 are all identical to that of the tank cover lifting tool 100. However, the second handle 204 of the tank cover lifting tool 200 is unique and different to the second handle 104 of the tank cover lifting tool 100.

As shown in FIG. 3, the handle center support 210 locates at a center of the tank cover lifting tool 200 with a first end and a second end. The first end of the handle center support 210 is connected with the first handle 202, and the second end of the handle center support 210 is connected with the second handle 204. The second handle 204 is different to the first handle 202 which is in a T shape and has a straight handle and a leg bar. In this example, the second handle 204 includes an end cap 242 and a hook clamp 252. The hook clamp 252 is connected with the second end of the handle center support 210 through the end cap 242. It can be found in FIG. 3 that the hook clamp 252 is located on an opposite side of the tank cover 128 as compare to the handle center support 210.

In an example embodiment, the tank cover lifting tool 200 requires two or more workers for the removing and attaching operations of the tank cover 128. The workers can apply vertical forces on both ends of the first handle 202 and on the hook clamp 252 of the second handle 204 to lift the tank cover 128. In this example, a worker can utilize additional tools, e.g., inserting a metal bar through the hook clamp 252 and then applying lifting forces to the end cap 242 through the metal bar and the intermediate hook clamp 252.

In an example embodiment, the first and second lifting blocks 206 and 208 of the tank cover lifting tool 200 engage the first and second tank cover handles 162 and 164, respectively. Similar to the first and second lifting blocks 106 and 108, the first and second lifting blocks 206 and 208 engage the corresponding tank cover handles by respectively passing the top portion of the corresponding tank cover handles through a first opening of the first lifting block 206 and a second opening of the second lifting block 208. Further, the tank cover lifting tool 200 is lifted to have the top portions of the first and second tank cover handles settled in a first pocket of the first lifting block 206 and a second pocket of the second lifting block 208, respectively. Similarly, the first and second pockets of the first and second lifting blocks 206 and 208 are respectively offset from the first opening and the second opening.

In an example embodiment, the tank cover lifting tool 100 further includes a plurality of guide pins and a plurality of guide pin back supports. In this example and similar to the components described in FIG. 1, the tank cover lifting tool 200 includes guide pins 215 and 216 and guide pin back supports 217 and 218. The configurations and profiles of the guide pins as well as the guide pin back supports of the tank cover lifting tool 200 are identical to that of the tank cover lifting tool 100.

Figure 4:
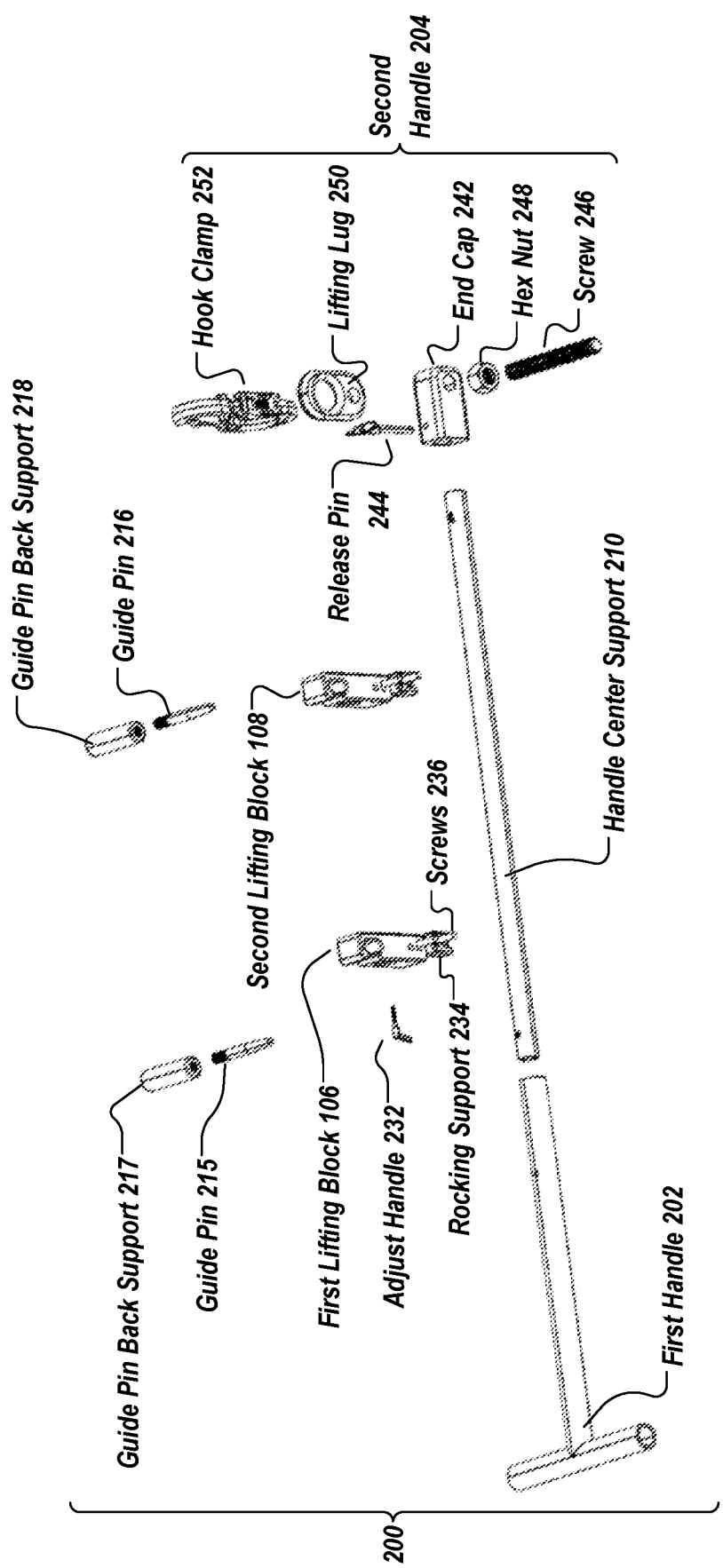
FIG. 4 is an exploded view of the tank cover lifting tool of FIG. 3 according to another example embodiment.

FIG. 4 is an exploded view of the tank cover lifting tool 200 of FIG. 3 according to another example embodiment. Here, FIG. 4 illustrates detailed configurations and components included in the second handle 204 of the tank cover lifting tool 200. As described earlier, the end cap 242 is connected with the handle center support 210 by inserting the second end of the handle center support 210 into the end cap 242. Further, a release pin 244 is inserted into holes of the end cap 242 and the handle center support 210 after aligning the holes therebetween. As shown in FIG. 4, the release pin 244 may include a pin shaft, a split ring at one end of the pin shaft, and a pair of spring loaded ball bearings projected out at the other end of the pin shaft. When the release pin 244 is installed, the spring loaded ball bearings project out of the pin shaft below the end cap 242, locking the second end of the handle center support 210 and the end cap 242.

In an example embodiment, the end cap 242 has a screw 246 inserted into a through hole of the end cap 242 along a direction perpendicular to the longitudinal axis of the handle center support 210. Additionally, the screw 246 is locked on the end cap 242 by threading a hex nut 248 thereon on one side of the end cap 242 which is opposite to the tank cover 128. On the other side of the end cap 242, a lifting lug 250 is connected with the end cap 242 by threading the screw 246 through a bottom hole of the lifting lug 250. The lifting lug 250 also includes an upper hole that is connected with the hook clamp 252. In this example, a distance between the lifting lug 250 and the end cap 242 can be adjusted by threading the lifting lug 250 close to or farther away from the end cap 242 on the screw 246.

Figures 5A, 5B:
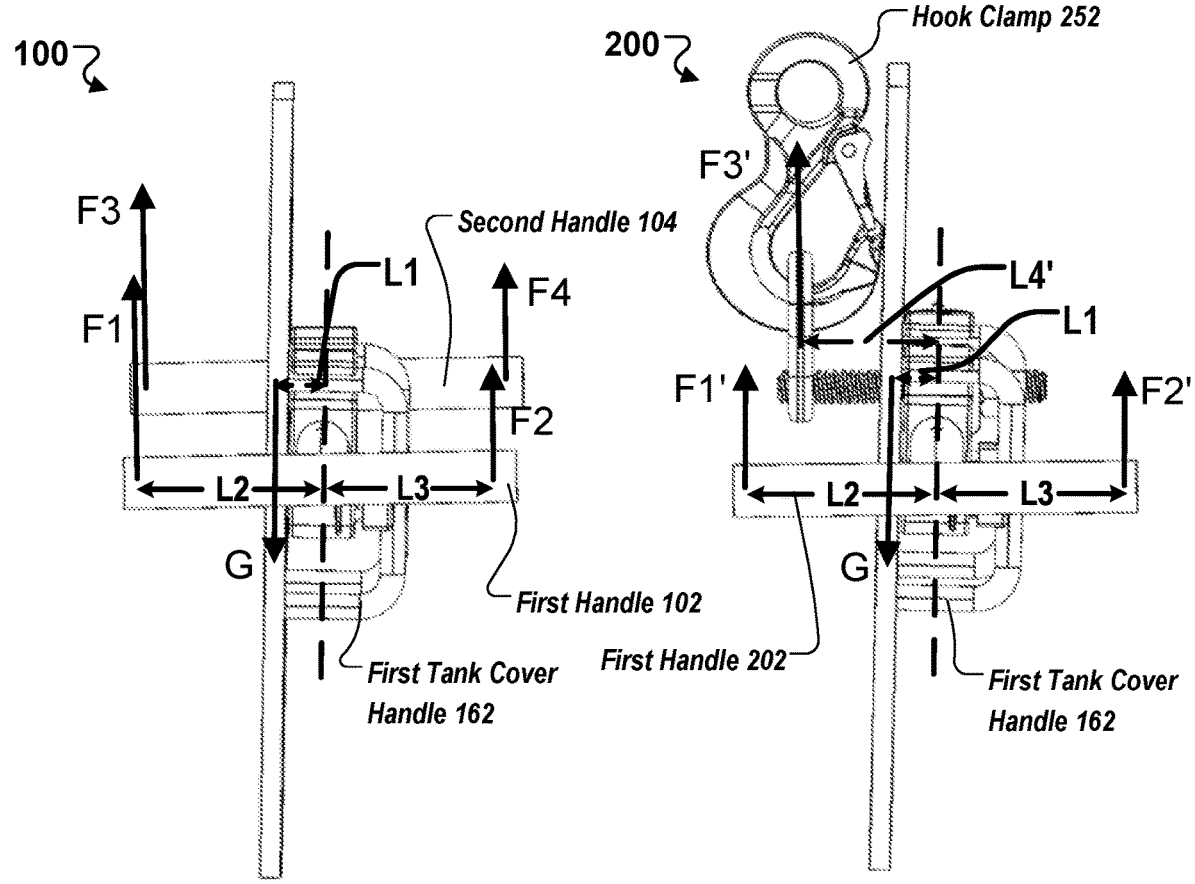
FIG. 5a illustrates lifting forces applied on the tank cover lifting tool of FIG. 1 according to an example embodiment.
FIG. 5b illustrates lifting forces applied on the tank cover lifting tool of FIG. 2 according to an example embodiment.

The tank cover lifting tools 100 and 200 are configured to lift the tank cover 128 while maintaining the tank cover's original upright position (as shown in FIGS. 1 and 3). To achieve a dynamic equilibrium during the removing or attaching operations of the tank cover 128, workers are required to apply vertical forces on the first and second handles of the tank cover lifting tools to counteract a counterclockwise moment caused by the gravity of the tank cover 128. FIGS. 5a and 5b illustrate lifting forces applied on the tank cover lifting tools 100 and 200 according to example embodiments, respectively.

In an example embodiment and as shown in FIG. 5a, the tank cover lifting tool 100 engages the tank cover 128 by contacting the top portion of the first and second tank cover handles 162 and 164. Here, the gravity of the tank cover 128 causes a counter-clockwise moment with a simplified moment arm L1 perpendicular to the gravity of the tank cover 128. Additionally, workers apply vertical lifting forces F1, F2, F3, and F4 at each two ends of the first and second handles 102 and 104, respectively, to lift the tank cover 128. Generally, the lifting forces F1 and F3 are equal to each other, and the lifting forces F2 and F4 are equal to each other, to maintain a horizontal balance of the tank cover lifting tool 100. In the view of FIG. 5a and on the left end of the first and second handles 102 and 104, the lifting forces F1 and F3 each forms a clockwise moment with a moment arm L2 perpendicular to the vertical forces F1 and F3. One the right ends of the first and second handles 102 and 104, the lifting forces F2 and F4 each forms a counter-clockwise moment with a moment arm L3 perpendicular to the vertical forces F2 and F4. In order to achieve a dynamic balance of the tank cover 128 on the tank cover lifting tool 100, the lifting forces applied on the tank cover lifting tool 100 satisfy the below equation (where G represents the gravitational force):

$$(F1+F3) \times L2 = G \times L1 + (F2+F4) \times L3 \qquad \text{(Equation 1)}.$$

In an example embodiment, the moment arms L2 and L3 are equal to each other, forces F1 and F3 are equal to each other, forces F2 and F4 are equal to each other, and the above equation can be further simplified as:

$$2F1 \times L2 = G \times L1 + 2F2 \times L2 \qquad \text{(Equation 2)}.$$

In this regard, each of the lifting forces F1 and F3 applied on the left ends of the first and second handles 102 and 104 is larger than each of the lifting forces F2 and F4 applied on the right ends of the first and second handles 102 and 104, so as to counteract the counter-clockwise moment caused by the gravity of the tank cover 128. Further, the lifting forces applied on the tank cover lifting tool 100 satisfy the below equation when lifting the tank cover 128:

$$F1+F2+F3+F4=G \qquad \text{(Equation 3)}.$$

In an example embodiment and as shown in FIG. 5b, the tank cover lifting tool 200 engages the tank cover 128 by contacting the top portion of the first and second tank cover handles 162 and 164. Similar to FIG. 5a, the gravity of the tank cover 128 causes a counterclockwise moment with a simplified force arm L1 perpendicular to the gravity of the tank cover 128. In this example, workers are required to apply vertical lifting forces F1' and F2' on two ends of the first handle 102, and a vertical lifting force F3' on the second handle 104, to lift the tank cover 128. In the view of FIG. 5b, the lifting forces F1' and F3' each forms a clockwise moment with the moment arm L2 and a moment arm L4', respectively. One the right end of the first handle 104, the lifting force F2 forms a counter-clockwise moment with the moment arm L3 perpendicular to the vertical force F2. Here, in order to achieve a dynamic equilibrium of the tank cover 128 on the tank cover lifting tool 200, the lifting forces applied on the tank cover lifting tool 200 satisfy below equation:

$$F1' \times L2 + F3' \times L4' = G \times L1 + F2' \times L3 \qquad \text{(Equation 4)}.$$

In an example embodiment, the moment arms L2 and L3 are equal to each other and are longer than the tank cover gravity moment arm L1. Further, the moment arm L4' is longer than the tank cover gravity moment arm L1. Similar to the lifting forces shown in FIG. 5a, the lifting forces applied on the tank cover lifting tool 200 satisfy below equation when lifting the tank cover 128:

$$F1'+F2'+F3'=G \qquad \text{(Equation 5)}.$$

In alternate embodiments, other variations on the configuration of the first handle 202 and the second handle 204 can be implemented. For example, referencing the embodiment in FIG. 1, a hook clamp could be attached to the first handle 102 and a second hook clamp could be attached to a second handle 104. In such an example, each hook clamp can be attached to a crane or other device to assist with the lifting of the tank cover.

Figure 6:
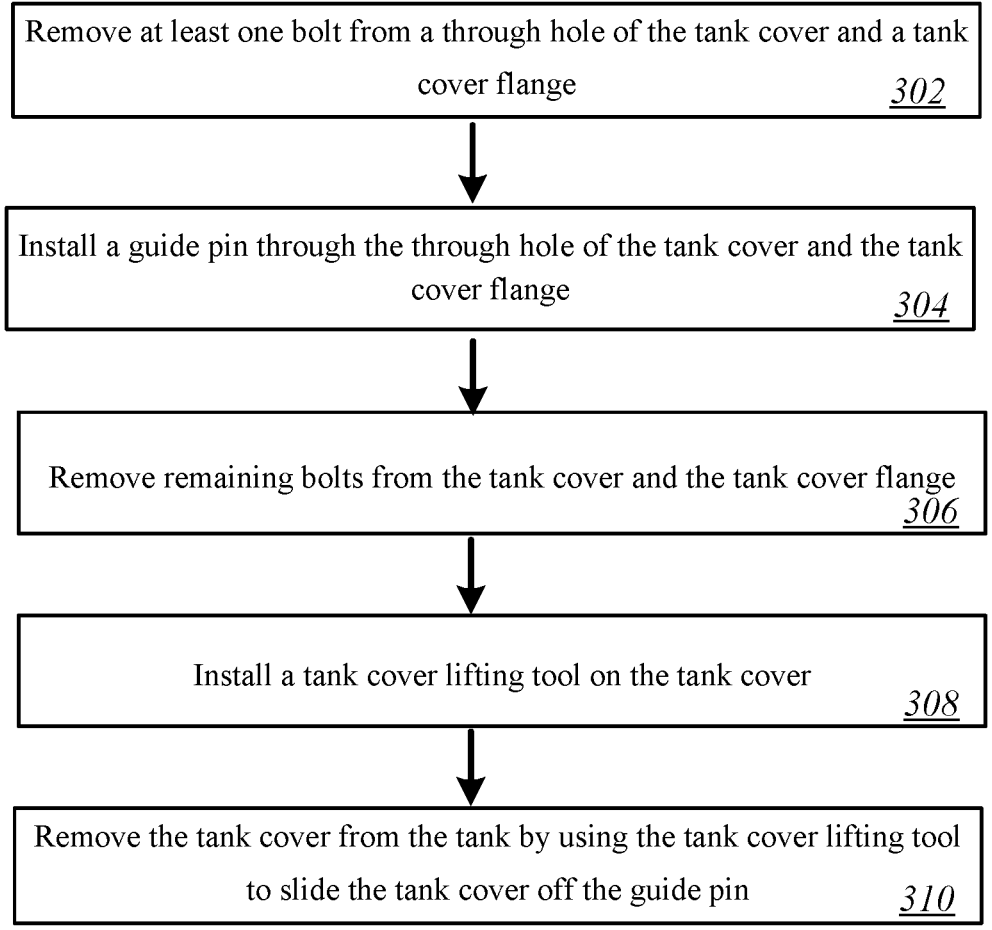
FIG. 6 illustrates a method for removing a tank cover by a tank cover lifting tool according to an example embodiment.

FIG. 6 illustrates a method 300 for removing a tank cover by a tank cover lifting tool according to an example embodiment. Referring to FIGS. 1 and 2, in an example embodiment, the method 300 includes removing at least one bolt from a through hole of the tank cover and a tank cover flange, at 302. For example, two bolts are removed from two through holes of the tank cover 128 and the tank cover flange 124. The method 300 also includes installing a guide pin through the through hole of the tank cover and the tank cover flange, at 304. For example, guide pins 115 and 116 are installed through those two through holes of the tank cover 128 and the tank cover flange 124, as shown in FIG. 1. In addition, the method 300 includes removing remaining bolts from the tank cover and the tank cover flange, at 306. For example, remaining bolts on through holes other than those two through holes of the tank cover 128 and the tank cover flange 124 are removed in this step. Further, the method 300 includes installing a tank cover lifting tool on the tank cover, at 308. For example, here, the tank cover lifting tool 100 is installed on the tank cover 128. Lastly, the method 300 includes removing the tank cover from the tank by using the tank cover lifting tool to slide the tank cover off the guide pin, at 310. For example, workers lift the first and second handles 102 and 104 of the tank cover lifting tool 100 to remove the tank cover 128 from the tank cover flange 124 by sliding the tank cover 128 off the guide pins 115 and 116.

In an example embodiment, the step of installing the tank cover lifting tool on the tank cover includes inserting a top portion of the first and second tank cover handles into a first cavity of the first lifting block and a second cavity of the second lifting block, respectively. For example, a top portion of the first tank cover handle 162 is inserted into the first cavity of the first lifting block 106. Similarly, a top portion of the second tank cover handle 164 is inserted into the second cavity of the second lifting block 108. In addition, the step of installing the tank cover lifting tool on the tank cover includes securing a first rocking support at a first location relative to the first lifting block and in contact to a gripping portion of the first tank cover handle by a first adjust handle. For example, the first rocking support 134 is connected to the first lifting block 106 through a plurality of screws 136. The first rocking support 134 is further secured by using the adjust handle 132 to tighten the first rocking support 134 against the gripping portion of the first tank cover handle 162. Similarly, the second rocking support 134 is secured to the second lifting block 108 through a plurality of screws 137 and an adjust handle can tighten the second rocking support to the gripping portion of the second tank cover handle 164.

Figure 7:
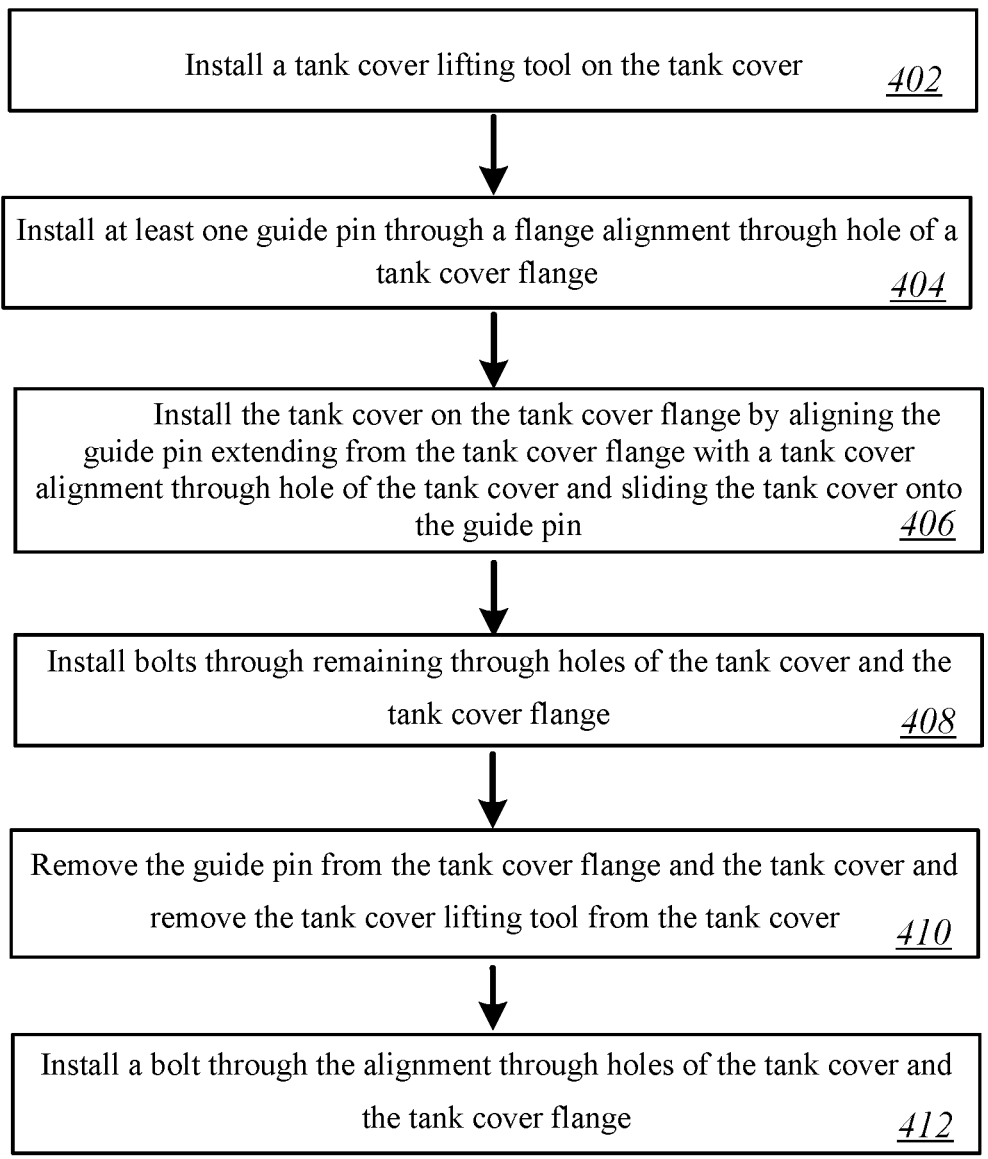
FIG. 7 illustrates a method for attaching a tank cover by a tank cover lifting tool according to an example embodiment.

FIG. 7 illustrates a method 400 for attaching a tank cover to a tank cover flange by a tank cover lifting tool according to an example embodiment. Referring to FIGS. 1 and 2, in an example embodiment, the method 400 includes installing a tank cover lifting tool on the tank cover, at 402. For example, the tank cover lifting tool 100 is installed on the tank cover 128. The method 400 also includes installing at least one guide pin through a flange alignment through hole of a tank cover flange, at 404. For example, two guide pins 115 and 116 are installed through alignment holes of the tank cover flange 124. In addition, the method 400 includes installing the tank cover on the tank cover flange by aligning the guide pin extending from the tank cover flange with a tank cover alignment through hole of the tank cover and sliding the tank cover onto the guide pin, at 406. Here, the guide pins 115 and 116 extend from the tank cover flange 124 and are aligned with two tank cover alignment through holes of the tank cover 124. Workers lift the tank cover 128 by lifting the first and second handles of the tank cover lifting tool 100, and then slide the tank cover 128 onto the guide pins 115 and 116. Further, the method 400 includes installing bolts through remaining through holes of the tank cover and the tank cover flange, at 408. For example, bolts are installed on remaining through holes of the tank cover 128 once the tank cover 128 is attached onto the tank cover flange 124. The method 400 also includes removing the guide pin from the tank cover flange and the tank cover and removing the tank cover lifting tool from the tank cover, at 410. For example, the guide pins 115 and 116 are removed from the tank cover flange 124 and the tank cover lifting tool 100 is then removed from the tank cover 128 in a next step. Lastly, the method 400 includes installing a bolt through the alignment through holes of the tank cover and the tank cover flange, at 412. For example, two bolts are installed through the alignment through holes where the guide pins 115 and 116 were located at.

For any figure shown and described herein, one or more of the components may be omitted, added, repeated, and/or substituted. Additionally, for any methods described herein, it should be understood that in alternate embodiments certain steps of the method may be omitted, performed in parallel, or performed in a different sequence and other steps may be added to the method. Accordingly, embodiments shown in a particular figure should not be considered limited to the specific arrangements of components shown in such figure. Further, if a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure.

Referring generally to the examples herein, any components of the tool (e.g., the handle center support, the first and second handles, and the first and second lifting blocks), described herein can be made from a single piece (e.g., as from a mold, injection mold, die cast, 3-D printing process, extrusion process, stamping process, or other prototype methods). In addition, or in the alternative, a component of the tool can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, and slotted fittings. One or more pieces that are mechanically coupled to each other can be coupled to each other in one or more of a number of ways, including but not limited to couplings that are fixed, hinged, removeable, slidable, and threaded.

Terms such as "first", "second", "top", "bottom", "side", "distal", "proximal", and "within" are used merely to distinguish one component (or part of a component or state of a component) from another. Such terms are not meant to denote a preference or a particular orientation, and are not meant to limit the embodiments described herein. In the example embodiments described herein, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Although particular embodiments have been described herein in detail, the descriptions are by way of example. The features of the embodiments described herein are representative and, in alternative embodiments, certain features, elements, and/or steps may be added or omitted. Additionally, modifications to aspects of the embodiments described herein may be made by those skilled in the art without departing from the spirit and scope of the following claims, the scope of which are to be accorded the broadest interpretation so as to encompass modifications and equivalent structures.

What is claimed is:

1. A tank cover lifting tool, comprising:
a handle center support;
a first handle connected to one end of the handle center support;
a second handle connected to another end of the handle center support;
a first lifting block that is locked on the handle center support, the first lifting block comprising a first cavity that receives a top portion of a first tank cover handle of a tank cover; and
a second lifting block that is locked on the handle center support, the second lifting block comprising a second cavity that receives a top portion of a second tank cover handle of the tank cover.

2. The tank cover lifting tool of claim 1, wherein the first cavity of the first lifting block has a first opening and a first pocket into which the top portion of the first tank cover handle fits, wherein the first pocket is offset from the first opening, wherein the second cavity of the second lifting block has a second opening and a second pocket into which the top portion of the second tank cover handle fits, and wherein the second pocket is offset from the second opening.

3. The tank cover lifting tool of claim 1, wherein the first lifting block has a first hole through which the handle center support passes, and wherein the second lifting block has a second hole through which the handle center support passes.

4. The tank cover lifting tool of claim 1, wherein a longitudinal axis of the handle center support is perpendicular to the top portion of the first tank cover handle and the top portion of the second tank cover handle.

5. The tank cover lifting tool of claim 1, wherein the handle center support has a first detent pin located at the one end of the handle center support and a second detent pin located at the other end of the handle center support.

6. The tank cover lifting tool of claim 5,
wherein the first handle comprises a first leg bar, the first leg bar having a plurality of holes and the first handle being connected with the handle center support by inserting the one end of the handle center support into the first leg bar and locking the first detent pin into one of the plurality of holes of the first leg bar, and
wherein the second handle comprises a second leg bar, the second leg bar having a plurality of holes and the second handle being connected with the handle center support by inserting the other end of the handle center support into the second leg bar and locking the second detent pin into one of the plurality of holes of the second leg bar.

7. The tank cover lifting tool of claim 5, wherein locations of the first detent pin and the second detent pin are equidistant from a center of the handle center support.

8. The tank cover lifting tool of claim 1,
wherein the first lifting block comprises a first rocking support that engages a gripping portion of the first tank cover handle, and
wherein the second lifting block comprises a second rocking support that engages a gripping portion of the second tank cover handle.

9. The tank cover lifting tool of claim 1, wherein a tank opening has a guide pin and wherein the tank cover lifting tool facilitates sliding the tank cover onto the guide pin to close the tank opening.

10. The tank cover lifting tool of claim 1, wherein a length of the tank cover lifting tool is longer than a length of the tank cover.

11. The tank cover lifting tool of claim 1, further comprising a first safety clip and a second safety clip, wherein the first handle has a first plurality of holes along a first leg bar and the second handle has a second plurality of holes along a second leg bar, and wherein the handle center support has a first through hole at one end and a second through hole at another end.

12. The tank cover lifting tool of claim 11,
wherein the first handle is connected with the handle center support by inserting the one end of the handle center support into the first leg bar and installing the first safety clip through one of the first plurality of holes of the first handle and the first through hole of the handle center support, and
wherein the second handle is connected with the handle center support by inserting the another end of the handle center support into the second leg bar and installing the second safety clip through one of the second plurality of holes of the second handle and the second through hole of the handle center support.

13. The tank cover lifting tool of claim 1, wherein the second handle is replaceable with an end cap, wherein the end cap is connected with the handle center support by inserting the other end of the handle center support into a cavity of the end cap, the end cap being locked on the handle center support by inserting a release pin through the end cap and the other end of the handle center support.

14. The tank cover lifting tool of claim 13, wherein the end cap includes a through hole and a screw passing through the through hole, wherein the screw is locked on the end cap by threading a hex nut at one side of the end cap.

15. The tank cover lifting tool of claim 14, further comprising:
a hook clamp, the hook clamp being connected with the end cap by a lifting lug connecting with the hook clamp and threading on the screw at another side of the end cap.

16. A method for removing a tank cover from a tank, comprising:
removing at least one bolt from a through hole of the tank cover and a tank cover flange;
installing a guide pin through the through hole of the tank cover and the tank cover flange;
removing remaining bolts from the tank cover and the tank cover flange;
installing a tank cover lifting tool on the tank cover; and
removing the tank cover from the tank by using the tank cover lifting tool to slide the tank cover off the guide pin.

17. The method for removing the tank cover of claim 16, wherein the tank cover lifting tool comprises:
a handle center support,
a first handle connected to one end of the handle center support,
a second handle connected to another end of the handle center support,
a first lifting block that is locked on the handle center support and that is configured to engage a first tank cover handle of the tank cover, and
a second lifting block that is locked on the handle center support and that is configured to engage a second tank cover handle of the tank cover.

18. The method for removing the tank cover of claim 17, wherein installing the tank cover lifting tool on the tank cover comprises:
inserting a top portion of the first tank cover handle into a first cavity of the first lifting block,
inserting a top portion of the second tank cover handle into a second cavity of the second lifting block,
securing a first rocking support at a first location relative to the first lifting block and in contact to a gripping portion of the first tank cover handle by a first adjust handle, and
securing a second rocking support at a second location relative to the second lifting block and in contact to a gripping portion of the second tank cover handle by a second adjust handle.

19. A method for attaching a tank cover to a tank, comprising:
installing a tank cover lifting tool on the tank cover;
installing at least one guide pin through a flange alignment through hole of a tank cover flange;
installing the tank cover on the tank cover flange by aligning the guide pin extending from the tank cover flange with a tank cover alignment through hole of the tank cover and sliding the tank cover onto the guide pin;
installing bolts through remaining through holes of the tank cover and the tank cover flange;
removing the guide pin from the tank cover flange and the tank cover and removing the tank cover lifting tool from the tank cover; and
installing a bolt through the alignment through holes of the tank cover and the tank cover flange.

\* \* \* \* \*